United States Patent [19]

Gauthiere et al.

[11] Patent Number: 5,671,902

[45] Date of Patent: Sep. 30, 1997

[54] AXIALLY MOVEABLE PLATE VALVE

[76] Inventors: John Gustave Gauthiere, 2157 Beuna Vista Dr., Greeley, Colo. 80631; Paul Douglas Wood, 536 37 Ave., Greeley, Colo. 80634

[21] Appl. No.: 404,740

[22] Filed: Mar. 15, 1995

[51] Int. Cl.[6] .............................. F16K 31/143; F16K 1/00
[52] U.S. Cl. ................................. 251/63.5; 251/319
[58] Field of Search ............................. 251/144, 635, 251/319, 367, 147

[56] References Cited

U.S. PATENT DOCUMENTS

| | | | |
|---|---|---|---|
| 2,840,337 | 6/1958 | Sasserson et al. | 251/144 |
| 3,361,154 | 1/1968 | Alexandre | 251/367 |
| 3,420,495 | 1/1969 | Muehl | 251/144 |
| 3,529,804 | 9/1970 | Perrin | 251/63.5 |
| 4,056,117 | 11/1977 | Deeks | 251/144 |
| 4,194,523 | 3/1980 | Lubieniecki | 251/144 |
| 4,326,557 | 4/1982 | Behle | 251/144 |
| 5,139,663 | 8/1992 | Maples | 251/144 |
| 5,249,601 | 10/1993 | Thomas | 251/144 |
| 5,280,875 | 1/1994 | Kennedy | 251/144 |

*Primary Examiner*—Hoang Nguyen

[57] ABSTRACT

A valve for permitting or precluding fluid communication between a fluid reservoir and a pipe. The inventive device includes a valve seat securable to a flange of the pipe. A support plate is adjustably positioned above the valve seat and mounts a fluid actuator thereover. A valve plate is coupled to the fluid actuator and can be axially moved relative to the valve seat to permit or preclude fluid transfer therethrough. The valve utilizes a pressure of the fluid within the reservoir to retain the valve plate against the valve seat in a closed condition.

7 Claims, 3 Drawing Sheets

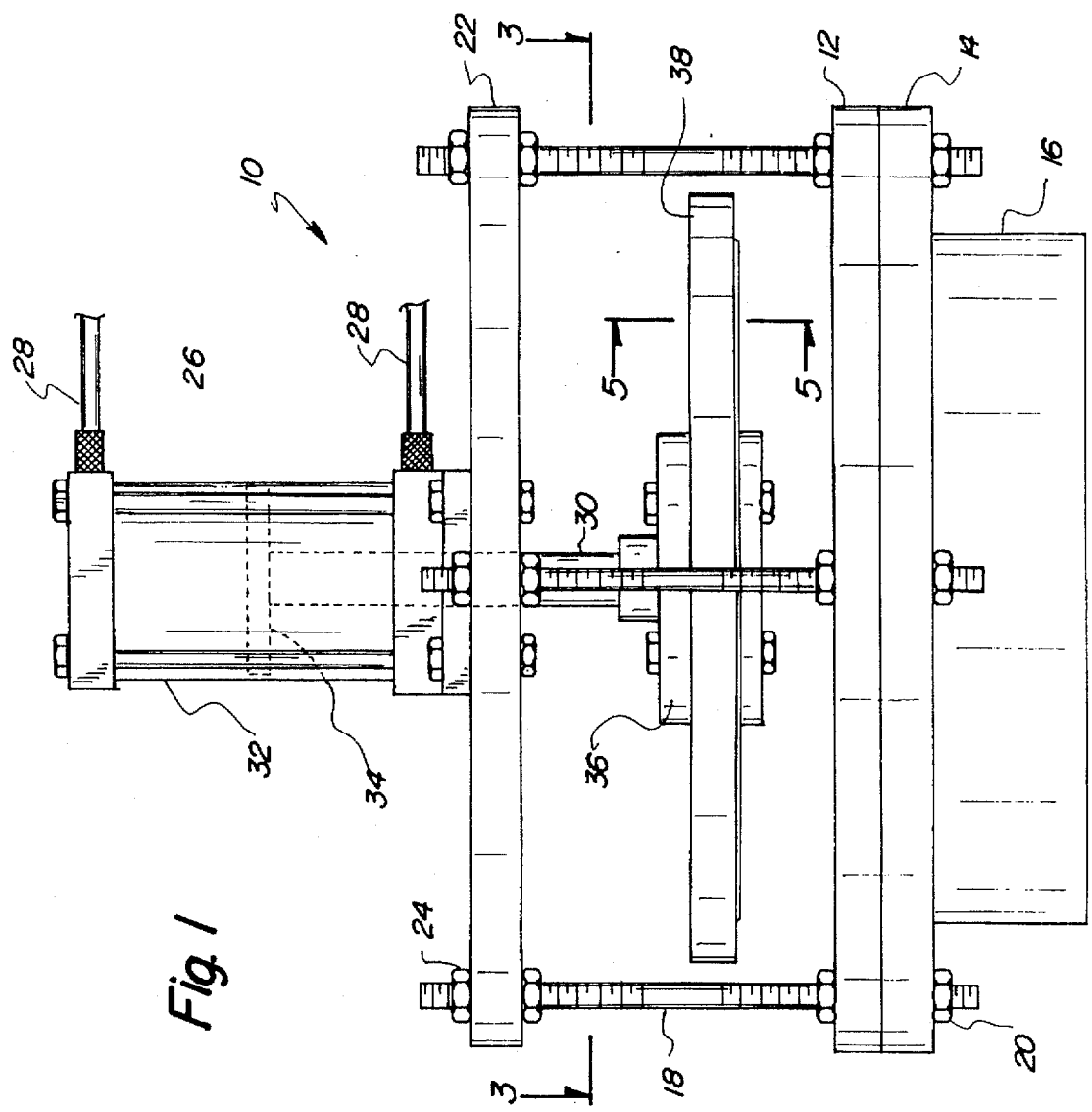

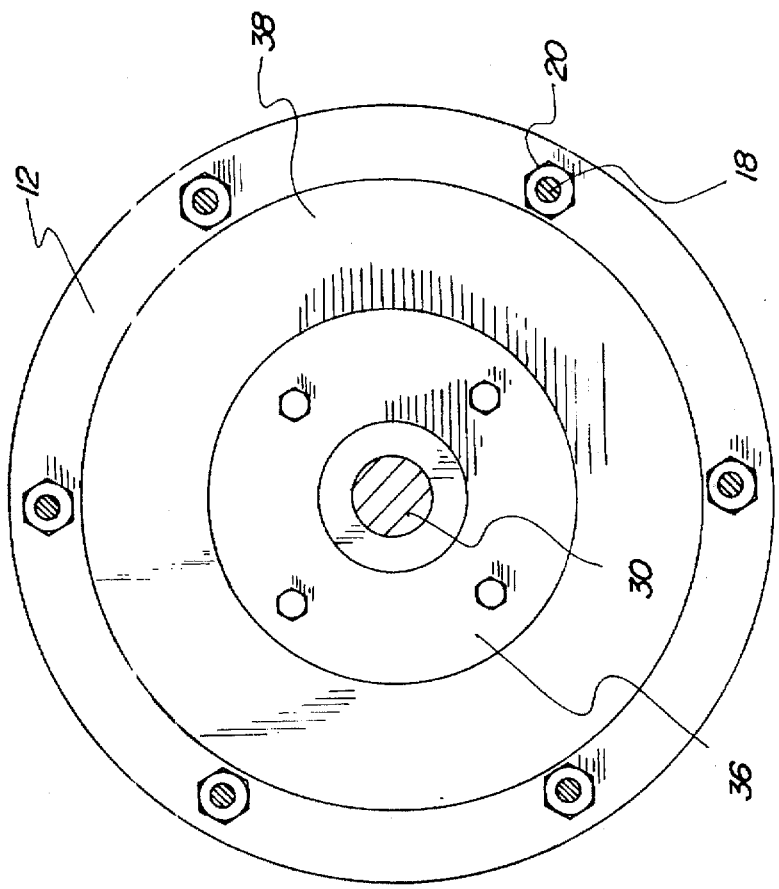
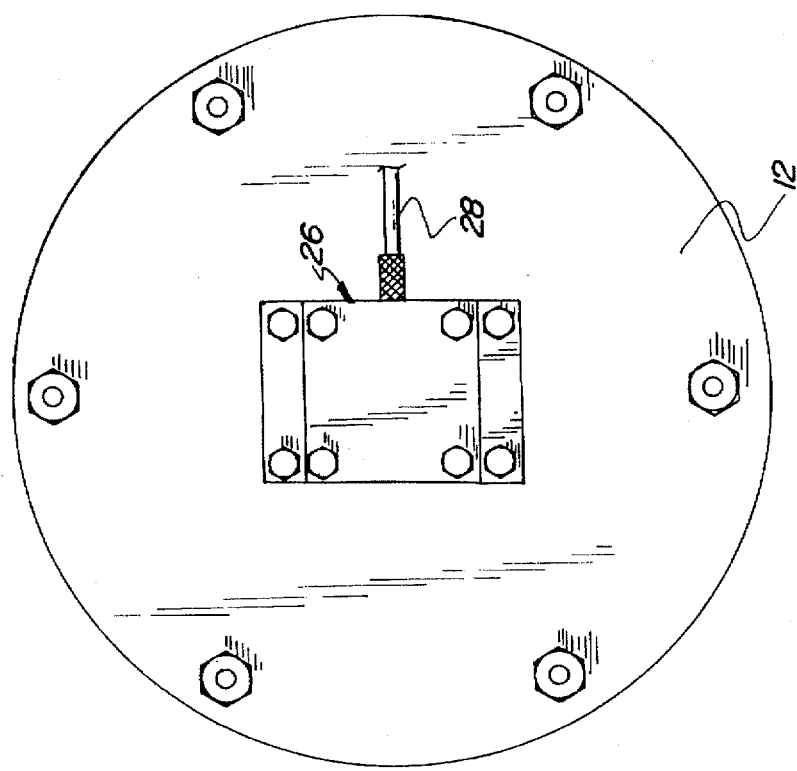

AXIALLY MOVEABLE PLATE VALVE

BACKGROUND OF THE INVENTION

1. Field of the Invention

The present invention relates to valve structures and more particularly pertains to an axially movable plate valve for permitting or precluding fluid communication between a fluid reservoir and a pipe.

2. Description of the Prior Art

The use of valve structures is known in the prior art. More specifically, valve structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art valve structures include U.S. Pat. No. 4,836,342; U.S. Pat. No. 4,284,262; U.S. Pat. No. 4,155,492; U.S. Pat. No. 5,259,588; and U.S. Pat. No. 5,052,430.

While these devices fulfill their respective, particular objectives and requirements, the aforementioned patents do not disclose an axially movable plate valve for permitting or precluding fluid communication between a fluid reservoir and a pipe which includes a valve seat securable to a flange of the pipe, a support plate adjustably positioned above the valve seat and mounting a fluid actuator thereover, and a valve plate coupled to the fluid actuator for axial movement relative to the valve seat to permit or preclude fluid transfer therethrough. Furthermore, none of the known prior art valve structure teach or suggest an axially movable valve plate of the aforementioned structure in which the valve utilizes a pressure of the fluid within reservoir to retain the valve plate against the valve seat in a closed condition.

In these respects, the axially moveable plate valve according to the present invention substantially departs from the conventional concepts and designs of the prior art, and in so doing provides an apparatus primarily developed for the purpose of permitting or precluding fluid communication between a fluid reservoir and a pipe.

SUMMARY OF THE INVENTION

In view of the foregoing disadvantages inherent in the known types of valve structures now present in the prior art, the present invention provides a new axially moveable plate valve construction wherein the same can be utilized for permitting or precluding fluid communication between a fluid reservoir and a pipe. As such, the general purpose of the present invention, which will be described subsequently in greater detail, is to provide a new axially moveable plate valve apparatus and method which has many of the advantages of the valve structures mentioned heretofore and many novel features that result in a axially moveable plate valve which is not anticipated, rendered obvious, suggested, or even implied by any of the prior art valve structures, either alone or in any combination thereof.

To attain this, the present invention generally comprises a valve for permitting or precluding fluid communication between a fluid reservoir and a pipe. The inventive device includes a valve seat securable to a flange of the pipe. A support plate is adjustably positioned above the valve seat and mounts a fluid actuator thereover. A valve plate is coupled to the fluid actuator and can be axially moved relative to the valve seat to permit or preclude fluid transfer therethrough. The valve utilizes a pressure of the fluid within the reservoir to retain the valve plate against the valve seat in a closed condition.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new axially moveable plate valve apparatus and method which has many of the advantages of the valve structures mentioned heretofore and many novel features that result in a axially moveable plate valve which is not anticipated, rendered obvious, suggested, or even implied by any of the prior art valve structures, either alone or in any combination thereof.

It is another object of the present invention to provide a new axially moveable plate valve which may be easily and efficiently manufactured and marketed.

It is a further object of the present invention to provide a new axially moveable plate valve which is of a durable and reliable construction.

An even further object of the present invention is to provide a new axially moveable plate valve which is susceptible of a low cost of manufacture with regard to both materials and labor, and which accordingly is then susceptible of low prices of sale to the consuming public, thereby making such axially moveable plate valves economically available to the buying public.

Still yet another object of the present invention is to provide a new axially moveable plate valve which provides in the apparatuses and methods of the prior art some of the advantages thereof, while simultaneously overcoming some of the disadvantages normally associated therewith.

Still another object of the present invention is to provide a new axially moveable plate valve for permitting or precluding fluid communication between a fluid reservoir and a pipe.

Yet another object of the present invention is to provide a new axially moveable plate valve which includes a valve seat securable to a flange of the pipe, a support plate adjustably positioned above the valve seat and mounting a fluid actuator thereover, and a valve plate coupled to the fluid actuator for axial movement relative to the valve seat to permit or preclude fluid transfer therethrough.

Even still another object of the present invention is to provide a new axially moveable plate valve of the aforementioned structure in which the valve utilizes a pressure of the fluid within the reservoir to retain the valve plate against the valve seat in a closed condition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of an axially moveable plate valve according to the present invention.

FIG. 2 is a top plan view thereof.

FIG. 3 is a cross sectional view taken along line 3—3 of FIG. 1.

DESCRIPTION OF THE PREFERRED EMBODIMENT

Figure 4:
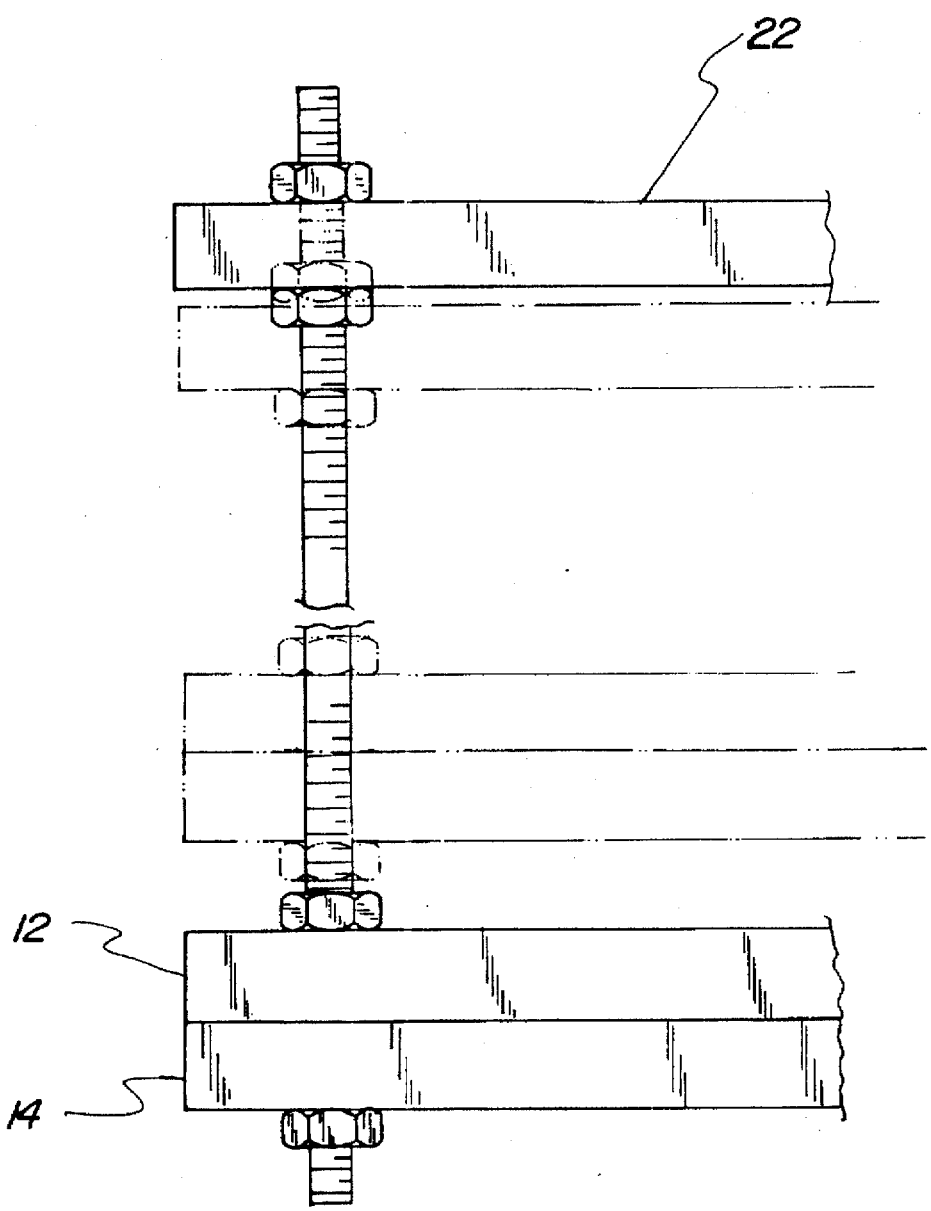
FIG. 4 is a side elevation view of a portion of the present invention.

With reference now to the drawings, and in particular to FIGS. 1–5 thereof, a new axially moveable plate valve embodying the principles and concepts of the present invention and generally designated by the reference numeral 10 will be described.

More specifically, it will be noted that the axially moveable plate valve 10 comprises a substantially planar valve seat 12 having an unlabeled center aperture extending therethrough and securable to a flange 14 of an associated drain pipe 16. Although not specifically illustrated, it is desirable for the valve seat 12 to be mounted within a fluid reservoir, such as a swimming pool or the like wherein the entire device 10 is immersed. The valve seat 12 can be coupled to the flange 14 by a plurality of threaded stanchions 18 which extend therethrough and a pair of flange securing nuts 20 engaged to each of the threaded stanchions 18 so as to capture the valve seat 12 and the flange 14 together in the abutting relation illustrated in FIG. 1. As shown in FIGS. 2 and 3, the threaded stanchions 18 are preferably radially spaced about a circumferential perimeter of the valve seat 12 and flange 14.

A support plate 22 includes a plurality of through-extending apertures which permit a passage of the threaded stanchions 18 therethrough, whereby a pair of support plate securing nuts 24 are engaged to each one of the threaded stanchions 18 to secure the support plate 22 to the respective threaded stanchion. By this structure, the support plate 22 can be positioned in a substantially parallel orientation relative to the valve seat 12 and flange 14 illustrated in FIG. 1, and can also be adjusted relative thereto through a movement of the support plate relative the threaded stanchions or alternatively, a movement of the threaded stanchions 18 relative to the valve seat 12 and flange 14. Such adjustable movement of the support plate 22 relative valve seat 12 and associated flange 14 is illustrated in FIG. 4, wherein movement of these portions of the present invention 10 is illustrated in phantom.

The support plate 22 includes an unlabeled through-extending center aperture above which a fluid actuator 26 is mounted to the support plate. The fluid actuator 26 includes at least one fluid line 28, and preferably a pair of fluid lines 28 which cooperate to effect movement of an actuator rod 30 extending through the center aperture of the support plate 22. To this end, the fluid actuator 26 preferably comprises a cylinder 32 having a piston 34 slidably disposed therewithin and mechanically coupled to the actuator rod 30, wherein fluid directed through a first or upper fluid line 28 will bias the piston 34 in a downward direction, with fluid being directed through a second fluid line 28 to bias the piston 34 and a second or upward direction. Preferably, the fluid actuator 26 comprises a pneumatic actuator wherein the fluid of choice is pressurized or compressed air.

Figure 5:
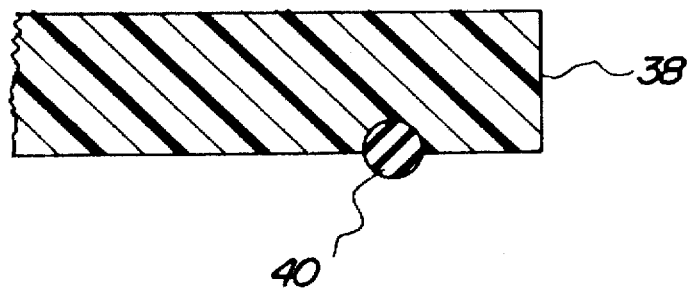
FIG. 5 is a cross sectional view taken along line 5—5 of FIG. 1.

The actuator rod 30 of the fluid actuator 26 extends through the center aperture and the support plate 22 to a point between the support plate and the valve seat 12. A lower distal end of actuator rod 30 is secured to a valve mounting plate 36 to which a valve plate 38 is secured. The valve plate 38 is dimensioned so as to cover the through-extending center aperture and the valve seat 12, whereby a placement of the valve plate 38 into abutting relationship relative to the valve seat 12 will preclude fluid communication through the valve seat 12, and a movement of the 15 valve plate away from the valve seat 72 will permit fluid communication through the center aperture of the valve seat. To enhance sealing of the valve plate 38 against the valve seat 12, a substantially circular cross section o-ring seal 40 extends within a groove formed circumferentially about a lower surface of the valve plate 38, as illustrated in FIG. 5. By this structure, the fluid actuator 26 can be selectively operated to move the valve plate 38 relative to the valve seat 12 to either permit or preclude fluid transfer through the center aperture of the valve seat 12.

In use, the axially moveable plate valve 10 according to the present invention can be easily installed within a fluid reservoir and coupled to a flange 14 of a drain pipe 16 thereof. When the fluid reservoir is filled with a fluid, the gravitational weight or pressure of the fluid against an upper surface of the valve plate 38 will serve to retain the valve plate in an abutting relationship relative to the valve seat 12 to preclude fluid communication across the valve 10. As can now be understood, an injection of pressurized air through the lowermost fluid line 28 illustrated in FIG. 1, will bias the piston 34 in an upward direction thereby separating the valve plate 38 from the valve seat 12, whereby fluid is allowed to pass around the valve plate and through the center aperture in the valve seat. Upon removal of the pressurized air from the lower most fluid line 28 and presurizing the upper most fluid line 28, the valve will close. The gravitational weight or pressure of the fluid within the fluid reservoir will bias the valve plate 38 in a downward direction against the valve seat 12 to keep the valve 10 closed. A pair of fluid lines 28 as illustrated in FIG. 1 is thus preferably provided to effect exact articulation of the valve 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A axially moveable plate valve comprising:
    a substantially planar valve seat having a valve seat center aperture extending therethrough, said valve seat being securable to a flange of an associated drain pipe;
    a support plate supported in a spaced relationship relative to said planar valve seat, said support plate including a through-extending support plate center aperture;
    a valve plate positioned between said support plate and said valve seat and being selectively movable between an open position wherein said valve plate is spaced from said valve seat and a closed position wherein said valve plate covers said valve seat center aperture;
    actuator means to effect movement of said valve plate relative to said valve seat; and
    stanchion means for supporting said support plate in a spaced relationship relative to said valve seat, said stanchion means being adapted to permit easy adjustment of the spacing between said support plate and said valve seat to thereby adjust the spacing between said valve seat and said valve plate in said open position.

2. The axially moveable plate valve of claim 1, wherein said support plate includes a plurality of through-extending stanchion apertures extending circumferentially thereabout, and said valve seat includes a plurality of through-extending stanchion apertures extending circumferentially thereabout; and wherein said stanchion means comprises a plurality of threaded stanchions extending through said stanchion apertures; and a plurality of flange securing nuts engaged to said threaded stanchions for capturing said valve seat and said flange together in an abutting relation; and a plurality of support plate securing nuts engaged to said threaded stanchions to adjustably secure said support plate relative to said valve seat.

3. The axially moveable plate valve of claim 1, wherein said actuator means to effect movement of said valve plate relative to said valve seat comprises an actuator mounted to said support plate, said actuator comprising a fluid actuator including a cylinder, a piston slidably disposed within said cylinder, and an actuator rod coupled to said piston and projecting exteriorly of said cylinder, wherein fluid directed into said cylinder will bias said piston to move said actuator rod, said actuator rod extending through said center aperture of said support plate to a point between said support plate and said valve seat, with a lower distal end of said actuator rod being secured to said valve plate.

4. The axially moveable plate valve of claim 1, wherein said valve plate includes a circumferential groove formed about a lower surface thereof, and further comprising an o-ring seal extending within said groove.

5. An axially moveable plate valve comprising:
    a substantially planar valve seat having a valve seat center aperture extending therethrough, said valve seat being securable to a flange of an associated drain pipe;
    a support plate supported in a spaced relationship relative to said planar valve seat, said support plate including a through-extending support plate center aperture;
    a valve plate positioned movably between said support plate and said valve seat for selectively covering said valve seat center aperture; and
    actuator means to effect movement of said valve plate relative to said valve seat;
    wherein said support plate includes a plurality of through-extending stanchion apertures extending circumferentially thereabout, and said valve seat includes a plurality of through-extending stanchion apertures extending circumferentially thereabout; and further comprising a plurality of threaded stanchions extending through said stanchion apertures; and a plurality of flange securing nuts engaged to said threaded stanchions for capturing said valve seat and said flange together in an abutting relation; and a plurality of support plate securing nuts engaged to said threaded stanchions to adjustably secure said support plate relative to said valve seat.

6. The axially moveable plate valve of claim 5, wherein said actuator means to effect movement of said valve plate relative to said valve seat comprises an actuator mounted to said support plate, said actuator comprising a fluid actuator including a cylinder, a piston slidably disposed within said cylinder, and an actuator rod coupled to said piston and projecting exteriorly of said cylinder, wherein fluid directed into said cylinder will bias said piston to move said actuator rod, said actuator rod extending through said center aperture of said support plate to a point between said support plate and said valve seat, with a lower distal end of said actuator rod being secured to said valve plate.

7. The axially moveable plate valve of claim 5, wherein said valve plate includes a circumferential groove formed about a lower surface thereof, and further comprising an o-ring seal extending within said groove.

* * * * *